United States Patent
Wang et al.

(10) Patent No.: US 7,260,318 B2
(45) Date of Patent: Aug. 21, 2007

(54) COMPUTER DEVICE CAPABLE OF PLAYING DVD FILMS WITHOUT THE NEED OF EXECUTING AN OPERATING SYSTEM

(75) Inventors: Ming-Chang Wang, Taoyuan (TW); Wen Hsiung Chang, Yunlin Hsien (TW); Chih Wen Liu, Taipei (TW)

(73) Assignee: Clevo Co., Sun Chung, Taipei Hsien (TW)

( * ) Notice: Subject to any disclaimer, the term of this patent is extended or adjusted under 35 U.S.C. 154(b) by 966 days.

(21) Appl. No.: 10/600,421

(22) Filed: Jun. 23, 2003

(65) Prior Publication Data

US 2004/0258401 A1 Dec. 23, 2004

(51) Int. Cl.
  *H04N 5/00* (2006.01)
  *G06F 9/00* (2006.01)
(52) U.S. Cl. .......................... 386/126; 713/2
(58) Field of Classification Search ............ None
  See application file for complete search history.

(56) References Cited

U.S. PATENT DOCUMENTS

| | | | |
|---|---|---|---|
| 6,507,495 B1* | 1/2003 | Hailey et al. ............ | 361/748 |
| 6,839,836 B2* | 1/2005 | Cole et al. ............... | 713/2 |
| 6,920,573 B2* | 7/2005 | Lee ......................... | 713/323 |
| 2004/0006690 A1* | 1/2004 | Du et al. .................. | 713/2 |
| 2004/0248617 A1* | 12/2004 | Oba et al. ................. | 455/557 |

* cited by examiner

Primary Examiner—James J. Groody
Assistant Examiner—Heather R. Jones
(74) Attorney, Agent, or Firm—Birch, Stewart, Kolasch & Birch, LLP

(57) ABSTRACT

A computer device capable of playing DVD films without the need of running an operating system is disclosed. The computer device comprises a computer keyboard unit comprising a keyboard controller, a low-voltage differential signal (LVDS) transmitter, wherein the LVDS transmitter has an output end connected to a liquid crystal display (LCD) monitor; a DVD-ROM for reading and outputting audio/video DVD data; a DVD format and image decoder connected to the DVD-ROM through a multiplexer; and a DVD control switch disposed on the computer keyboard unit and connected to the power switching module, wherein the power switching module functions as a controller when the DVD control switch is activated to turn on the work power of the keyboard controller, the DVD-ROM, the DVD format and image decoder, the multiplexer, the image processor, the LVDS transmitter, the LCD monitor, the audio amplifier, and the speaker.

6 Claims, 5 Drawing Sheets

COMPUTER DEVICE CAPABLE OF PLAYING DVD FILMS WITHOUT THE NEED OF EXECUTING AN OPERATING SYSTEM

BACKGROUND OF THE INVENTION

1. Field of the Invention

The present invention relates to a computer device capable of playing digital versatile disc (DVD) films without the need of running an operating system. More particularly, the present invention relates to a computer device that enables a user to watch DVD films on a liquid crystal display (LCD) screen without the need of running Windows operating system.

2. Description of the Prior Art

It is often desirable that a computer user can use a DVD-ROM of a desktop or laptop computer to watch movies. Conventionally, to watch DVD films through a computer DVD-ROM, a user has to turn the monitor on (in a desktop computer case), boot his computer first and then wait for about 50 seconds to enter the Windows operating system. After that, he or she has to execute the application program of a DVD-ROM via the normal Windows interface. Only through the time-consuming process, the computer user can watch the DVD films. The above-mentioned prior art process is not convenient to the computer users.

In light of foregoing, there is a strong need to provide an improved computer device such that one can watch DVD films on the computer monitor without the need of entering Windows operating system.

SUMMARY OF THE INVENTION

The main objective of the invention is to provide an improved computer device such that one can watch DVD films on the computer LCD monitor without the need of executing Windows operating system, thereby creating appendant value of the computers.

Another objective of the present invention is to provide a computer device, which is controlled by a remote control, such that one can watch DVD films on the computer LCD monitor without the need of executing Windows operating system.

Still another objective of the present invention is to provide a computer device that enables a user to watch DVD films in an alternative manner.

To achieve these and other advantages and in accordance with the purposes of the present invention, as embodied and broadly described herein, the present invention provides a computer device capable of playing digital versatile disc (DVD) films without the need of running an operating system. A DVD control switch is provided on the computer keyboard unit. The DVD control switch is connected to a power switching module which functions as a controller when the DVD control switch is activated to turn on the work power of the keyboard controller, the DVD-ROM, the DVD format and image decoder, the multiplexer, the image processor, the LVDS transmitter, the LCD monitor, the audio amplifier, and the speaker.

In accordance with another preferred embodiment of the present invention, the on/off of the work power of the above-mentioned components may be controlled by a remote control.

Other objects, advantages and novel features of the invention will become more clearly and readily apparent from the following detailed description when taken in conjunction with the accompanying drawings.

DETAILED DESCRIPTION OF THE PREFERRED EMBODIMENTS

It is understood that the accompanying drawings are included to provide a further understanding of the invention, and are incorporated in and constitute a part of this specification. The drawings illustrate embodiments of the invention and, together with the description, serve to explain the principles of the invention.

Figure 1:
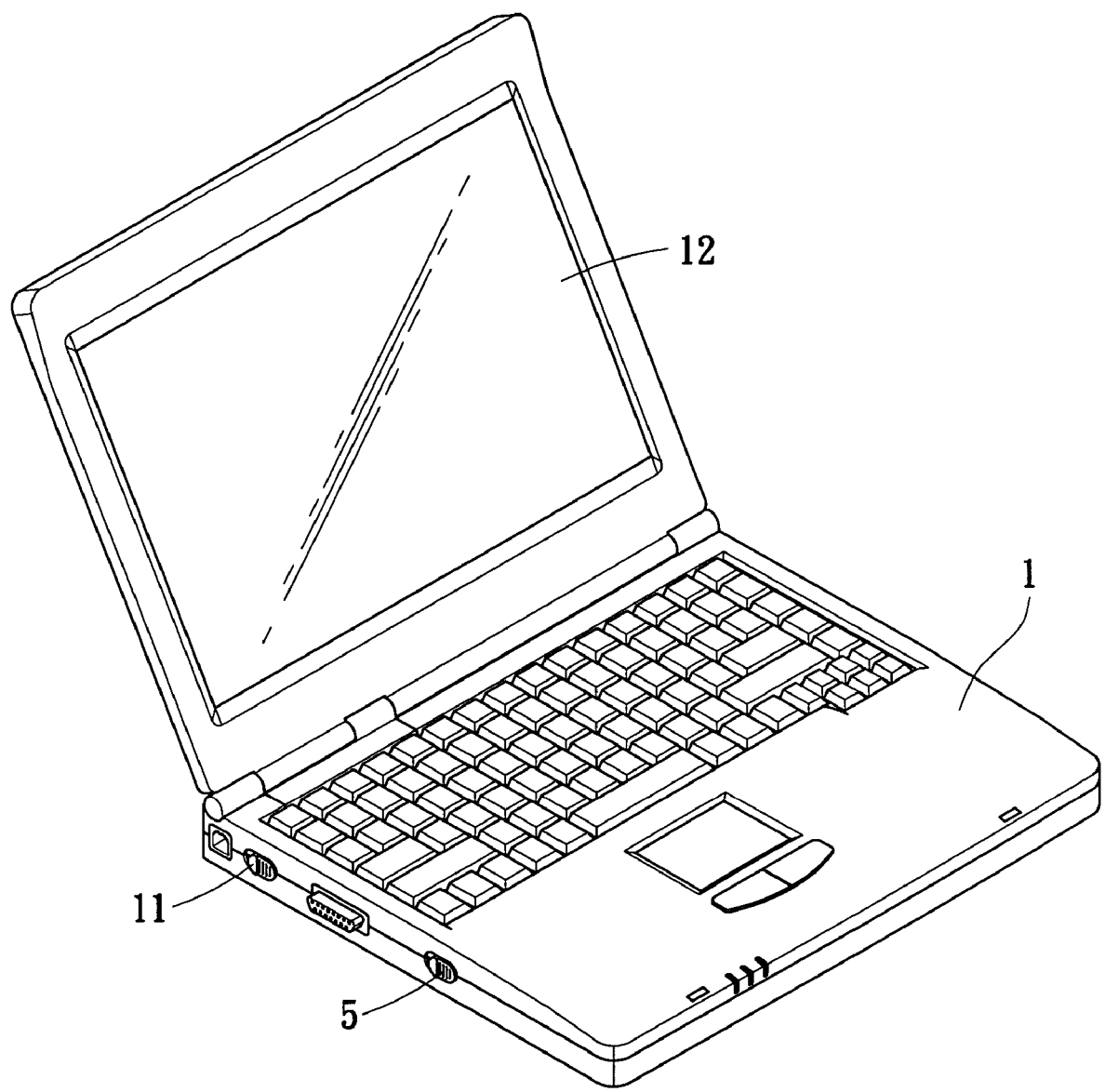
FIG. 1 is a side view of a notebook according to the present invention.
Figure 2:
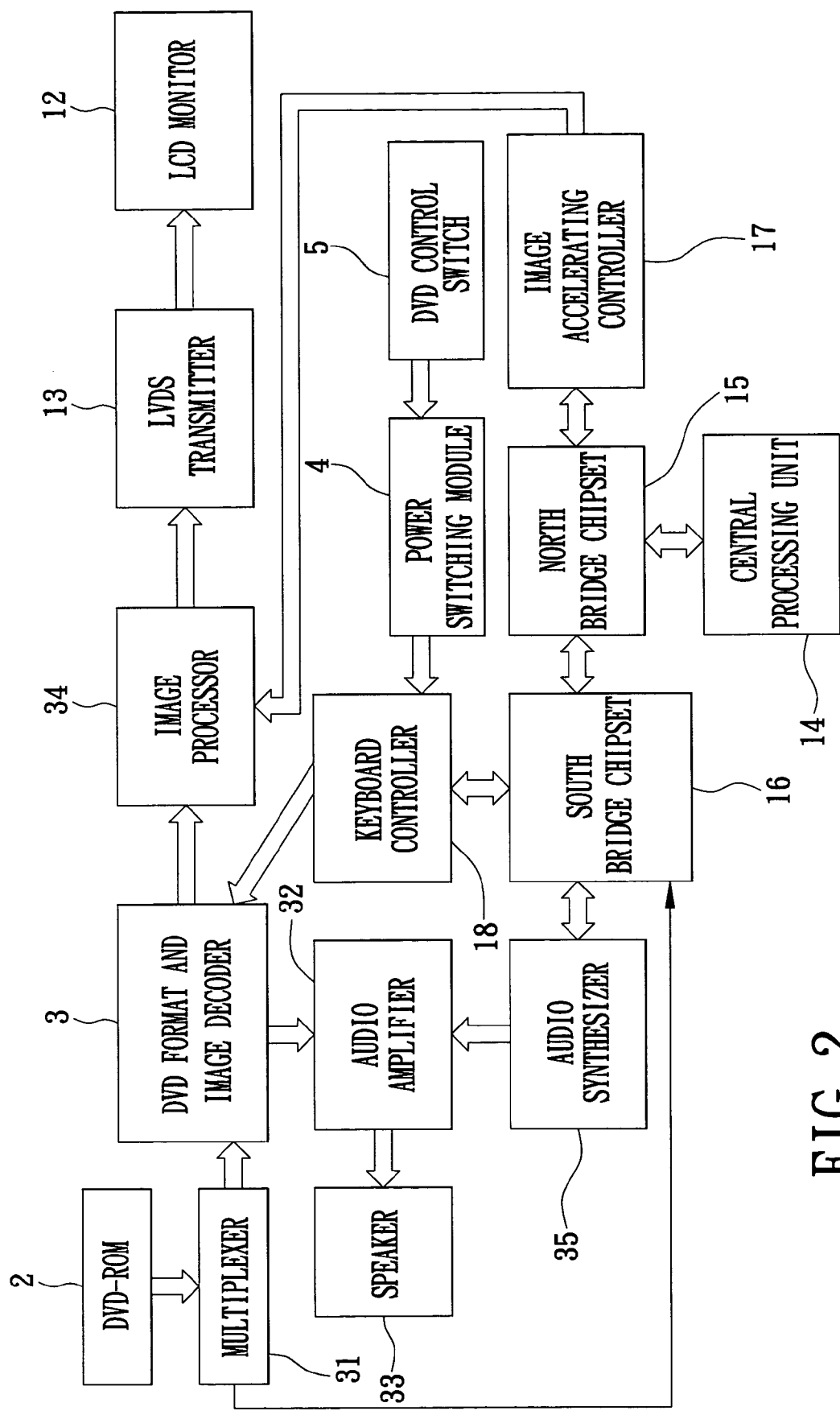
FIG. 2 is a block diagram showing the present invention.

Please refer to FIG. 1 and FIG. 2. FIG. 1 is a perspective view of a notebook according to one preferred embodiment of the present invention. FIG. 2 is a block diagram showing the present invention. The present invention pertains to a computer device that enables one to watch DVD films without the need of executing Windows operating system. The computer device comprises a computer keyboard unit 1, a DVD-ROM 2, a DVD format and image decoder 3, a power switching module 4, and a DVD control switch 5.

A computer control switch 11 is disposed on the computer keyboard unit 1. A LCD monitor 12 is provided. The LCD monitor 12 is connected to a low-voltage differential signal (LVDS) transmitter 13. The computer keyboard unit 1 comprises an inner circuit comprising a central processing unit 14, which communicates with a north bridge chipset 15. The north bridge chipset 15 is connected with a south bridge chipset 16 and an image-accelerating controller 17. The south bridge chipset 16 is connected to a keyboard controller 18.

The DVD-ROM 2 reads and outputs the audio/video DVD data on a DVD disc.

The DVD format and image decoder 3 is connected to the DVD-ROM 2 through a multiplexer 31. The DVD format and image decoder 3 has an output end connected to an audio amplifier 32, which has an output end connected to a speaker 22. An image processor 34 connects the DVD format and image decoder 3 with the LVDS transmitter 13. The DVD format and image decoder 3 is used to transform the inputted IDE interface signals from the multiplexer 31 into RGB digital signals and analog signals. Then, the DVD format and image decoder 3 outputs the RGB digital signals to the image processor 34. The image processor 34 outputs RGB digital signals to the LVDS transmitter 13. Then, the LVDS transmitter 13 sends low-voltage differential signals to the LCD monitor 12 for displaying. The analog signals are sent to the audio amplifier 32 and then to the speaker 33.

The power switching module 4 is connected to the keyboard controller 18. The power switching module 4 is controlled by either the DVD control switch 5 or the computer control switch 11 to turn on partial or overall work power.

The DVD control switch 5 may be disposed on the computer keyboard unit 1 and is connected to the power switching module 4. The power switching module 4 functions as a controller when the DVD control switch 4 is activated to turn on the work power of the keyboard controller 18, the DVD-ROM 2, the DVD format and image decoder 3, the multiplexer 31, the image processor 34, the LVDS transmitter 13, the LCD monitor 12, the audio amplifier 32, and the speaker 33.

When the DVD control switch 5 is on, the keyboard controller 18, the DVD-ROM 2, the DVD format and image decoder 3, the multiplexer 31, the image processor 34, the LVDS transmitter 13, the LCD monitor 12, the audio amplifier 32, and the speaker 33 are powered by the output voltage of the power switching module 3. By doing this, one can watch DVD films through the LCD monitor 12. That is, the computer functions as a normal DVD player.

Figure 3:
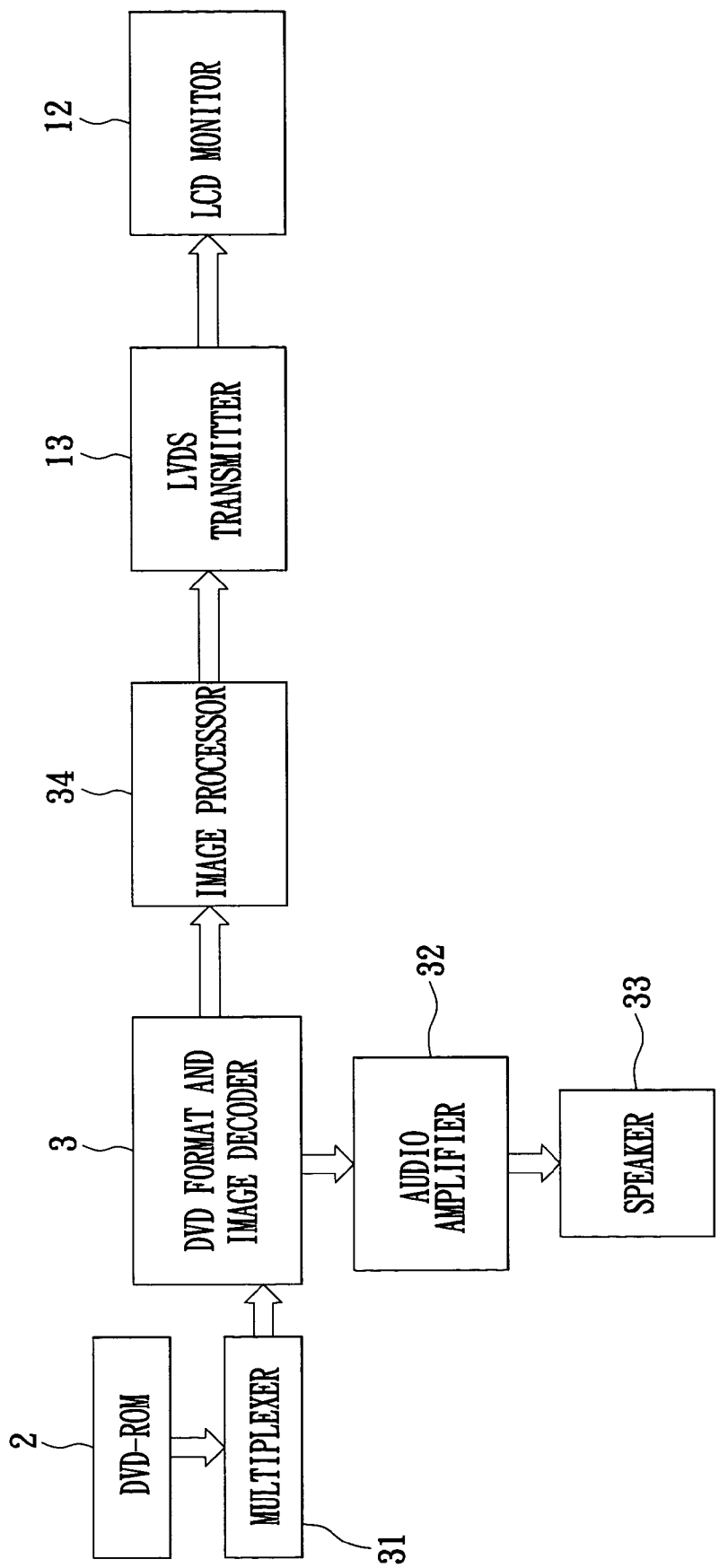
FIG. 3 is a block diagram showing the audio/video signal flow when the DVD control switch is on according to the present invention.

Please refer to FIG. 3. FIG. 3 is a block diagram showing the audio/video signal flow when the DVD control switch is on according to the present invention. As shown in FIG. 3, the IDE interface signals are transformed by the DVD-ROM 2 through the multiplexer 31 into RGB digital signals, which is then transmitted to the image processor 34 to output digital signals, which is then transmitted to the LVDS transmitter 13 for sending low-voltage differential signals to the LCD monitor 12.

The audio signals are processed by the DVD-ROM 2 to transmit the IDE interface signals to the DVD format and image decoder 3, thereby generating left/right sound channel analog signals, which are then transmitted to the audio amplifier 32 to amplify the left/right sound channel analog signals. Then, the amplified left/right sound channel analog signals are sent to the speaker 33.

When the computer control switch 11 is on, the DVD-ROM 2, the DVD format and image decoder 3, the multiplexer 31, the image processor 34, the LVDS transmitter 13, the LCD monitor 12, the audio amplifier 32, the keyboard controller 18, the speaker 33, the audio synthesizer 35, the south bridge chipset 16, the north bridge chipset 15, the central processing unit 14, and the image accelerating controller 17 are powered by the output voltage of the power switching module 4. In this case, one can execute any application programs through the Windows interface. For example, the user can execute the application program of the DVD-ROM 2 and watch DVD films through the LCD monitor.

Figure 4:
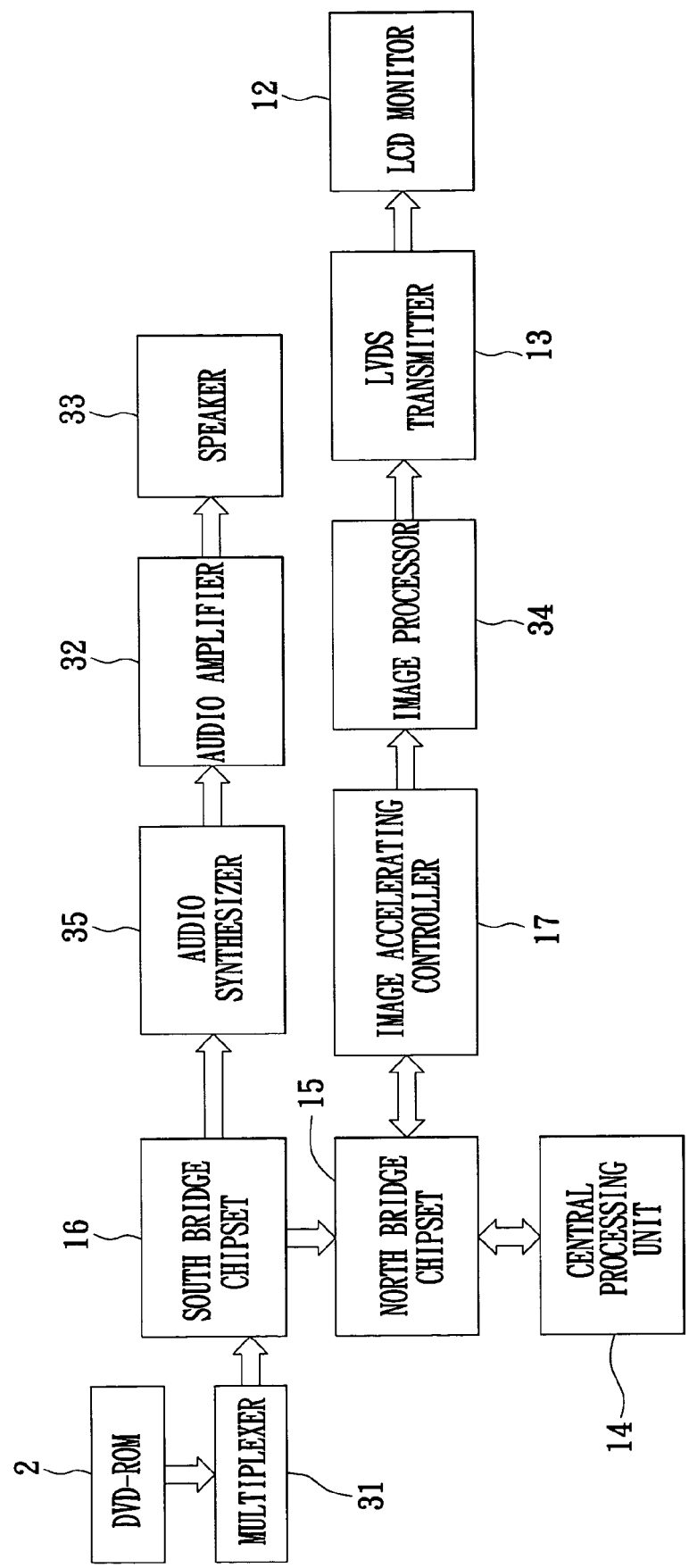
FIG. 4 is a block diagram showing audio/video signal flow when the computer control switch is on according to the present invention.

Please refer to FIG. 4. FIG. 4 is a block diagram showing audio/video signal flow when the computer control switch is on according to the present invention. As shown in FIG. 4, the IDE interface signals are transmitted by the DVD-ROM 2 through a multiplexer 31 to the inner circuit components of the computer system. The image processing is known in the art. The image signals are processed by the south bridge chipset 16, the north bridge chipset 15, the central processing unit 14, and the image accelerating controller 17 to output RGB digital signals. The RGB digital signals are then transmitted to the image processor 34. The image processor 34 outputs the digital image signals to the LVDS transmitter 13 which sends low-voltage differential signals to the LCD monitor 12.

The audio IDE signals are processed by the DVD-ROM 2 through the multiplexer 31, the south bridge chipset 16, then transmitted to audio synthesizer 35 and the audio amplifier 32. The left/right channel audio signals are sent to the speaker 33.

Figure 5:
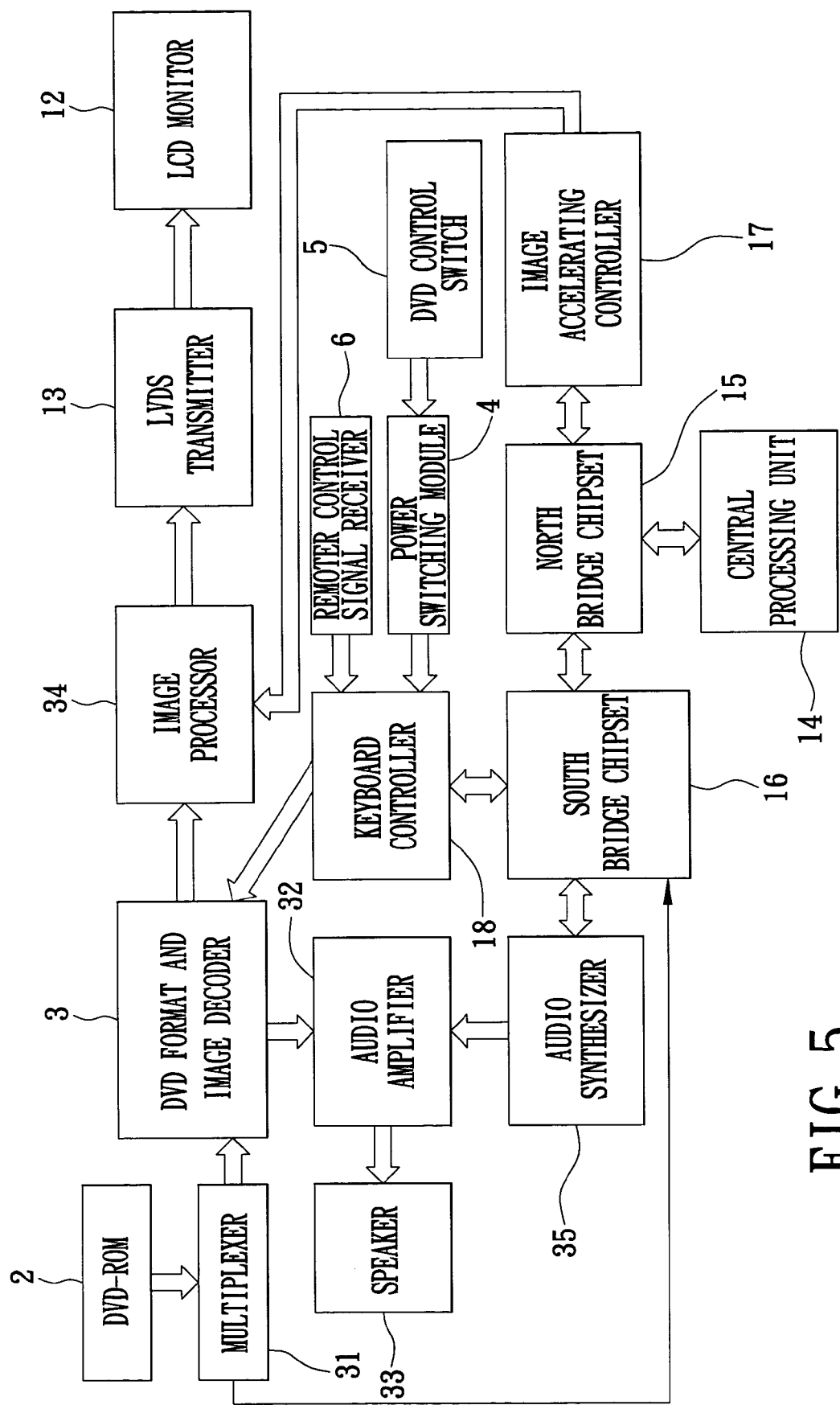
FIG. 5 is a block diagram according to another preferred embodiment of the present invention.

Please refer to FIG. 5. FIG. 5 is a block diagram according to another preferred embodiment of the present invention.

As shown in FIG. 5, a remote control signal receiver 6 is connected to the keyboard controller 18. The remote control signal receiver 6 is used to receive remote control signals sent from a remote control to turn on the power switching module 4, the keyboard controller 18, the DVD-ROM 2, the DVD format and image decoder 3, the multiplexer 31, the image processor 34, the LVDS transmitter 13, the LCD monitor 12, the audio amplifier 32, the speaker 33, the audio synthesizer 35, the south bridge chipset 16, the north bridge chipset 15, the central processing unit 14, and the image accelerating controller 17. In this case, the user can control the computer device through the remote control 6 to watch DVD films without the need of executing Windows operating system.

In summary, the features of the present invention include:
(1) The users can now watch DVD films on the computer LCD monitor without the need of executing Windows operating system, thereby creating the appendant value of the computer.
(2) It is convenient that one can use a remote control to watch DVD films on the computer LCD monitor without the need of executing Windows operating system.
(3) The present invention provides a computer device that enables a user to watch DVD films in an alternative manner.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A computer device capable of playing DVD films without the need of running an operating system, comprising:
   a computer keyboard unit comprising a keyboard controller, a low-voltage differential signal (LVDS) transmitter, wherein the LVDS transmitter has an output end connected to a liquid crystal display (LCD) monitor;
   a DVD-ROM for reading and outputting audio/video DVD data;
   a DVD format and image decoder connected to the DVD-ROM through a multiplexer, the DVD format and image decoder having an output end connected to an audio amplifier, which has an output end connected to a speaker, wherein an image processor connects the DVD format and image decoder with the LVDS transmitter, and wherein the DVD format and image decoder is used to transform the inputted IDE interface signals from the multiplexer into RGB digital signals and analog signals, then, the DVD format and image decoder outputs the RGB digital signals to the image processor, the image processor outputs RGB digital signals to the LVDS transmitter, the LVDS transmitter sends low-voltage differential signals to the LCD monitor for displaying, and wherein the analog signals are sent to the audio amplifier and then to the speaker; and
   a DVD control switch disposed on the computer keyboard unit and connected to the power switching module, wherein the power switching module functions as a controller when the DVD control switch is activated to turn on the work power of the keyboard controller, the DVD-ROM, the DVD format and image decoder, the multiplexer, the image processor, the LVDS transmitter, the LCD monitor, the audio amplifier, and the speaker.

2. The computer device capable of playing DVD films without the need of running an operating system as claimed in claim 1 wherein the computer keyboard unit comprises an inner circuit comprising a central processing unit, which communicates with a north bridge chipset, which is connected with a south bridge chipset and an image-accelerating controller, wherein the south bridge chipset is connected to the keyboard controller and an audio synthesizer, which is connected to the audio amplifier, wherein the image accelerating controller has an output end connected to the image processor.

3. The computer device capable of playing DVD films without the need of running an operating system as claimed in claim 1 wherein the computer keyboard unit comprises a computer control switch, and when the computer control switch is on, the DVD-ROM, the DVD format and image decoder, the multiplexer, the image processor, the LVDS transmitter, the LCD monitor, the audio amplifier the keyboard controller, the speaker, the audio synthesizer the south bridge chipset, the north bridge chipset, the central processing unit, and the image accelerating controller are powered by the output voltage of the power switching module, and wherein one can execute an application program through Windows interface.

4. A computer device capable of playing DVD films without the need of running an operating system, comprising:
a computer keyboard unit comprising a keyboard controller, a low-voltage differential signal (LVDS) transmitter, wherein the LVDS transmitter has an output end connected to a liquid crystal display (LCD) monitor;
a DVD-ROM for reading and outputting audio/video DVD data;
a DVD format and image decoder connected to the DVD-ROM through a multiplexer, the DVD format and image decoder having an output end connected to an audio amplifier, which has an output end connected to a speaker, wherein an image processor connects the DVD format and image decoder with the LVDS transmitter, and wherein the DVD format and image decoder is used to transform the inputted IDE interface signals from the multiplexer into RGB digital signals and analog signals, then, the DVD format and image decoder outputs the RGB digital signals to the image processor, the image processor outputs RGB digital signals to the LVDS transmitter, the LVDS transmitter sends low-voltage differential signals to the LCD monitor for displaying, and wherein the analog signals are sent to the audio amplifier and then to the speaker;
a power switching module connected to the keyboard controller; and
a remote control signal receiver connected to the keyboard controller, wherein the remote control signal receiver is used to receive remote control signals sent from a remote control to turn on the power switching module, the keyboard controller, the DVD-ROM, the DVD format and image decoder, the multiplexer, the image processor, the LVDS transmitter, the LCD monitor, the audio amplifier, and the speaker.

5. The computer device capable of playing DVD films without the need of running an operating system as claimed in claim 4 wherein the computer keyboard unit comprises an inner circuit comprising a central processing unit, which communicates with a north bridge chipset, which is connected with a south bridge chipset and an image-accelerating controller, wherein the south bridge chipset is connected to the keyboard controller and an audio synthesizer, which is connected to the audio amplifier, wherein the image accelerating controller has an output end connected to the image processor.

6. The computer device capable of playing DVD films without the need of running an operating system as claimed in claim 4 wherein the computer. keyboard unit comprises a computer control switch, and when the computer control switch is on, the DVD-ROM, the DVD format and image decoder, the multiplexer, the image processor, the LVDS transmitter, the LCD monitor, the audio amplifier, the keyboard controller, the speaker, the audio synthesizer, the south bridge chipset, the north bridge chipset, the central processing unit, and the image accelerating controller are powered by the output voltage of the power switching module, and wherein one can execute an application program through Windows interface.

* * * * *